US010841048B2

(12) United States Patent
Jiang et al.

(10) Patent No.: US 10,841,048 B2
(45) Date of Patent: Nov. 17, 2020

(54) HYBRID AUTOMATIC REPEAT REQUEST FEEDBACK METHOD AND APPARATUS

(71) Applicant: HUAWEI TECHNOLOGIES CO., LTD., Guangdong (CN)

(72) Inventors: Yue Jiang, Shanghai (CN); Youtuan Zhu, Shanghai (CN); Hongjie Hu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/432,115

(22) Filed: Jun. 5, 2019

(65) Prior Publication Data
US 2019/0288804 A1   Sep. 19, 2019

Related U.S. Application Data

(63) Continuation of application No. PCT/CN2016/108893, filed on Dec. 7, 2016.

(51) Int. Cl.
*H04L 1/20* (2006.01)
*H04B 17/336* (2015.01)
(Continued)

(52) U.S. Cl.
CPC .......... *H04L 1/203* (2013.01); *H04B 17/336* (2015.01); *H04L 1/0003* (2013.01);
(Continued)

(58) Field of Classification Search
CPC ......... H04L 1/203; H04L 1/20; H04L 1/0003; H04L 1/0071; H04L 1/1819; H04B 17/336
See application file for complete search history.

(56) References Cited

U.S. PATENT DOCUMENTS

| 7,933,602 B1* | 4/2011 | Balakrishnan ........ H04W 36/38 370/332 |
| 2002/0018446 A1* | 2/2002 | Huh ...................... H04L 1/1809 370/245 |

(Continued)

FOREIGN PATENT DOCUMENTS

| CN | 1925383 A | 3/2007 |
| CN | 101286825 A | 10/2008 |

(Continued)

OTHER PUBLICATIONS

Bang Chul Jung et al, Determining the optimum threshold values of MCS levels for retransmission packets in HARQ schemes. The 57th IEEE Semiannual Vehicular Technology Conference, 2003. VTC 2003-Spring, Jul. 9, 2003, 5 pages.

(Continued)

*Primary Examiner* — Christine Ng

(57) ABSTRACT

Embodiments are disclosed of a hybrid automatic repeat request feedback method and apparatus, and relates to the field of communications technologies. The hybrid automatic repeat request feedback method is applied to a receive end. After receiving data information sent by a transmit end, the receive end may determine, when target data in the data information is not checked, a measurement value of the target data, then generate feedback information based on the measurement value, and subsequently, send the feedback information to the transmit end, so that the transmit end can determine, based on the feedback information, whether the target data needs to be retransmitted.

4 Claims, 8 Drawing Sheets

(51) Int. Cl.
*H04L 1/00* (2006.01)
*H04L 1/18* (2006.01)
*H04L 5/00* (2006.01)

(52) U.S. Cl.
CPC .......... *H04L 1/0071* (2013.01); *H04L 1/1819* (2013.01); *H04L 1/20* (2013.01); *H04L 5/0055* (2013.01); *H04L 5/0082* (2013.01); *H04L 1/1812* (2013.01)

(56) References Cited

U.S. PATENT DOCUMENTS

| | | | |
|---|---|---|---|
| 2005/0032478 A1* | 2/2005 | Stephens | H04W 74/08 455/67.11 |
| 2005/0053088 A1* | 3/2005 | Cheng | H04B 7/2643 370/464 |
| 2009/0150738 A1* | 6/2009 | Nishio | H04L 1/20 714/749 |
| 2010/0146355 A1 | 6/2010 | Jiang et al. | |
| 2010/0260251 A1* | 10/2010 | Yokomakura | H04L 1/0009 375/232 |
| 2013/0182569 A1* | 7/2013 | Bertrand | H04L 1/0017 370/232 |
| 2013/0223501 A1 | 8/2013 | Kalyanasundaram et al. | |
| 2014/0241192 A1* | 8/2014 | Kim | H04B 7/0417 370/252 |
| 2015/0372843 A1* | 12/2015 | Bala | H04L 27/2649 375/295 |
| 2016/0128090 A1* | 5/2016 | Azarian Yazdi | H04L 1/1887 370/329 |
| 2016/0128092 A1 | 5/2016 | Azarian Yazdi et al. | |
| 2016/0234750 A1* | 8/2016 | Damji | H04L 1/0036 |
| 2016/0323068 A1 | 11/2016 | Yu | |
| 2018/0041312 A1 | 2/2018 | Li et al. | |

FOREIGN PATENT DOCUMENTS

| | | |
|---|---|---|
| CN | 101924617 A | 12/2010 |
| CN | 103580803 A | 2/2014 |
| CN | 104780029 A | 7/2015 |
| EP | 2945439 A1 | 11/2015 |
| JP | 2013-201575 A | 10/2013 |
| WO | 2016165131 A1 | 10/2016 |

OTHER PUBLICATIONS

Rong Wang, Research on HARQ Technology Based on Retransmission Times Optimization. Hubei University of Technology, Sep. 2015, 1 page.

* cited by examiner

HYBRID AUTOMATIC REPEAT REQUEST FEEDBACK METHOD AND APPARATUS

CROSS-REFERENCE TO RELATED APPLICATIONS

This application is a continuation of International Application No. PCT/CN2016/108893, filed on Dec. 7, 2016, the disclosure of which is hereby incorporated by reference in its entirety.

TECHNICAL FIELD

The present disclosure relates to the field of communications technologies, and in particular, to a hybrid automatic repeat request feedback method and apparatus.

BACKGROUND

A hybrid automatic repeat request (HARQ) feedback method is widely applied to various wireless communications systems, such as a Wideband Code Division Multiple Access (WCDMA) system and a Long Term Evolution (LTE) system. The HARQ feedback method can well compensate for impact of time variation and multipath fading of a radio mobile channel on signal transmission, and improve system robustness.

There is a HARQ feedback method in the prior art. In the method, after receiving data sent by a transmit end, a receive end sequentially decodes the data and performs cyclic redundancy check (CRC) on the data; and sends feedback information to the transmit end based on a check result. When the feedback information carries an acknowledgement (ACK), it indicates that the data is successfully sent, and the transmit end may send new data. When the feedback information carries a negative acknowledgement (NACK), it indicates that the transmit end needs to retransmit the data. In other words, the transmit end needs to resend previous data.

In a process of implementing an embodiment of the present disclosure, it is found that the foregoing method has at least the following disadvantages: A relatively long transmission time is required for the receive end to decode the received data and perform the CRC on the received data; and send the feedback information to the transmit end, and consequently, a low-latency service requirement cannot be met.

SUMMARY

To resolve a prior-art problem that a low-latency service requirement cannot be met, embodiments of the present disclosure provide a hybrid automatic repeat request feedback method and apparatus. The technical solutions are as follows:

According to a first aspect, a hybrid automatic repeat request feedback method is provided, and applied to a receive end, where the method includes: receiving data information sent by a transmit end, where the data information includes target data; when the target data in the data information is not checked, determining a measurement value of the target data, where the measurement value is used to indicate reliability of a physical channel for transmitting the target data; generating feedback information based on the measurement value, where the feedback information carries an acknowledgement (ACK) or a negative acknowledgement (NACK); and sending the feedback information to the transmit end, so that the transmit end determines, based on the feedback information, whether the target data needs to be retransmitted. In an embodiment, not checking the target data in the data information includes not performing a data integrity check on the target data in the data information. In an embodiment, the data integrity check is one of a cyclic redundancy check, a checksum, an error correction code, linear error correction code, or a Hamming Code.

The receive end can determine, when the target data in the data information is not checked, the measurement value of the target data, and send the feedback information to the transmit end based on the measurement value, so that the transmit end can determine, based on the feedback information, whether the target data needs to be retransmitted. Compared with the prior art, in this method, the receive end does not need to check the target data before sending the feedback information to the transmit end. Therefore, a total time for sending the feedback information is reduced and a consumed transmission time interval (TTI) is shorter. Therefore, a low-latency service requirement can be met.

Optionally, the measurement value may be a value of accumulated conditional mutual information (ACMI) of a signal-to-noise ratio of the physical channel, information statistics of the data information, a signal-to-interference-plus-noise ratio of the physical channel, and the like.

Optionally, the receive end is a base station or user equipment in a wireless communications system.

Optionally, the measurement value is a first quality value used to indicate a signal-to-noise ratio of the physical channel after the data information is equalized, and the generating feedback information based on the measurement value includes: when the first quality value is less than a quality threshold, generating the feedback information carrying the NACK; or when the first quality value is not less than a quality threshold, generating the feedback information carrying the ACK, where the quality threshold is determined based on at least one of a coding scheme, a code block length, and a bit rate of the target data.

The receive end can determine the quality threshold based on at least one of the coding scheme, the code block length, and the bit rate of the target data, and perform a decision without using check bits on the received target data based on the first quality value. In this case, the receive end does not need to check the target data before sending the feedback information to the transmit end. Therefore, a total time for sending the feedback information by the receive end is reduced, and a consumed TTI is shorter.

Optionally, the first quality value is a value of ACMI, the quality threshold is a symbol transmission rate of the target data, and the determining a measurement value of the target data includes: determining a bit-interleaved coded modulation (BICM) capacity of the physical channel; and determining the value of the ACMI based on the BICM capacity and a retransmission and combination mode of the target data.

The receive end can perform a decision without using check bits on the received target data based on the ACMI and the symbol transmission rate of the target data, so that a total time for sending the feedback information is reduced and a consumed TTI is shorter.

Optionally, the retransmission and combination mode of the target data is a chase combining CC mode or an incremental redundancy (IR) combination mode. The receive end can determine the corresponding value of the ACMI based on the retransmission and combination mode of the target data.

For example, when the retransmission and combination mode of the target data is the CC mode, if $ACMI_{CC}<R_1$, the receive end generates the feedback information carrying the NACK, or if $ACMI_{CC} \geq R_1$, the receive end generates the feedback information carrying the ACK, where $R_1$ represents the symbol transmission rate of the target data, and $ACMI_{CC}$ is ACMI when the retransmission and combination mode of the target data is the CC mode. When the retransmission and combination mode of the target data is the IR combination mode, if $ACMI_{IR}<R_1$, the receive end generates the feedback information carrying the NACK; or if $ACMI_{CC} \geq R_1$, the receive end generates the feedback information carrying the ACK, where $ACMI_{IR}$ is ACMI when the retransmission and combination mode of the target data is the IR combination mode.

Optionally, the measurement value is information statistics of the data information, and the generating feedback information based on the measurement value includes: determining an information error rate of the target data based on the information statistics; and when the information error rate is greater than an error rate threshold, generating the feedback information carrying the NACK; or when the information error rate is not greater than the error rate threshold, generating the feedback information carrying the ACK, where the error rate threshold is determined based on at least one of a coding scheme, a code block length, and a bit rate of the target data.

The receive end can determine the error rate threshold based on at least one of the coding scheme, the code block length, and the bit rate of the target data, and perform a decision without using check bits on the received target data based on the information error rate. In this case, the receive end does not need to check the target data before sending the feedback information to the transmit end. Therefore, a total time for sending the feedback information by the receive end is reduced, and a consumed TTI is shorter.

Optionally, the information statistics may be information statistics after the data information is demodulated or information statistics after the data information is decoded.

Optionally, the information error rate may be a code word error rate or an average bit error rate.

For example, when the information error rate is a code word error rate, if $P_\omega > P_{\omega,t}$, the receive end generates the feedback information carrying the NACK; or if $P_\omega \leq P_{\omega,t}$, the receive end generates the feedback information carrying the ACK, where $P_\omega$ represents the code word error rate, and $P_{\omega,t}$ represents a preset error rate threshold corresponding to the code word error rate. When the information error rate is an average bit error rate, if $P_b > P_{b,t}$, the receive end generates the feedback information carrying the NACK, or if $P_b \leq P_{b,t}$, the receive end generates the feedback information carrying the ACK, where $P_b$ represents the average bit error rate, and $P_{b,t}$ represents a preset error rate threshold corresponding to the average bit error rate.

Optionally, the measurement value is a signal-to-interference-plus-noise ratio of the physical channel, and the generating feedback information based on the measurement value includes: when the signal-to-interference-plus-noise ratio is less than a signal-to-interference-plus-noise ratio threshold, generating the feedback information carrying the NACK; or when the signal-to-interference-plus-noise ratio is not less than the signal-to-interference-plus-noise ratio threshold, generating the feedback information carrying the ACK, where the signal-to-interference-plus-noise ratio threshold is determined based on at least one of a coding scheme, a code block length, and a bit rate of the target data.

The receive end can determine the signal-to-interference-plus-noise ratio threshold based on at least one of the coding scheme, the code block length, and the bit rate of the target data, and perform a decision without using check bits on the received target data based on the signal-to-interference-plus-noise ratio of the physical channel. In this case, the receive end does not need to check the target data before sending the feedback information to the transmit end. Therefore, a total time for sending the feedback information by the receive end is reduced, and a consumed TTI is shorter.

For example, when the signal-to-interference-plus-noise ratio is a signal-to-interference-plus-noise ratio of the physical channel before the data information is equalized, if $SINR_1 < Threshold_{TBS}$, the receive end generates the feedback information carrying the NACK; or if $SINR_1 \leq Threshold_{TBS}$, the receive end generates the feedback information carrying the ACK, where $SINR_1$ represents the signal-to-interference-plus-noise ratio of the physical channel before the data information is equalized, and $Threshold_{TBS}$ represents a signal-to-interference-plus-noise ratio threshold corresponding to the signal-to-interference-plus-noise ratio.

When the signal-to-interference-plus-noise ratio is a signal-to-interference-plus-noise ratio of the physical channel after the data information is equalized, using an single carrier frequency division multiple access (SC-FDMA) system as an example, if $SINR_{SC-FDMA} < Threshold_{TBS}$, the receive end generates the feedback information carrying the NACK; or if $SINR_{SC-FDMA} \geq Threshold_{TBS}$, the receive end generates the feedback information carrying the ACK, where $SINR_{SC-FDMA}$ represents the signal-to-interference-plus-noise ratio of the physical channel after the data information is equalized, and $Threshold_{TBS}$ represents a signal-to-interference-plus-noise ratio threshold corresponding to the signal-to-interference-plus-noise ratio.

Optionally, the signal-to-interference-plus-noise ratio threshold may be determined based on the signal-to-interference-plus-noise ratio, a modulation and coding scheme (MCS) table, and a block error rate (BLER) curve.

Optionally, the measurement value is a signal-to-interference-plus-noise ratio of the physical channel, and the generating feedback information based on the measurement value includes: obtaining a transport block size (TBS) on the physical channel; determining a data transmission rate of the physical channel based on the signal-to-interference-plus-noise ratio; and when the TBS is less than the data transmission rate, generating the feedback information carrying the NACK; or when the TBS is not less than the data transmission rate, generating the feedback information carrying the ACK.

The receive end can perform a decision without using check bits on the received target data based on the TBS on the physical channel and the signal-to-interference-plus-noise ratio of the physical channel. In this case, the receive end does not need to check the target data before sending the feedback information to the transmit end. Therefore, a total time for sending the feedback information by the receive end is reduced, and a consumed TTI is shorter.

Optionally, the signal-to-interference-plus-noise ratio is a signal-to-interference-plus-noise ratio of the physical channel before the data information is equalized.

For example, when the signal-to-interference-plus-noise ratio is a signal-to-interference-plus-noise ratio of the physical channel before the data information is equalized, if TBS<Rate, the receive end generates the feedback information carrying the NACK; or if TBS≥Rate, the receive end generates the feedback information carrying the ACK, where TBS represents the transport block size on the physical channel, and Rate represents the data transmission rate of the physical channel.

The hybrid automatic repeat request feedback method in the embodiments of the present disclosure can shorten a HARQ cycle, reduce HARQ processes, and rapidly perform HARQ feedback, so that data is rapidly retransmitted. In the method, a quantity of data retransmissions in a low-latency service scenario can be increased, demodulation information a plurality of times can be obtained, and the plurality of pieces of demodulation information can be combined to obtain a HARQ gain. The method can be further applied to iterative detection in the prior art, such as demodulation iteration and decoding iteration in a data transmission process, simplifying the detection process and improving accuracy of a detection result; or may be applied to a HARQ combination process, simplifying the combination process and improving check accuracy.

According to a second aspect, a hybrid automatic repeat request feedback apparatus is provided, and applied to a receive end, where the hybrid automatic repeat request feedback apparatus includes at least one module, and the at least one module is configured to implement the hybrid automatic repeat request feedback method according to the first aspect.

According to a third aspect, a hybrid automatic repeat request feedback apparatus is provided, and applied to a receive end, where the hybrid automatic repeat request feedback apparatus includes: at least one processor, a memory, a communications module, at least one communications bus, and a communications antenna. The communications bus is configured to implement connection and communication between the components. The communications module may be applied to remote communication. The communications antenna is configured to receive and send a communication signal. The processor is configured to execute an application stored in the memory. The application includes the hybrid automatic repeat request feedback method according to the first aspect.

Technical effects obtained in the second aspect and the third aspect of the embodiments of the present disclosure are similar to those obtained by corresponding technical means in the first aspect, and details are not described herein again.

In conclusion, the technical solutions provided by the embodiments of the present disclosure have the following beneficial effects:

The receive end can determine, when the target data in the data information is not checked, the measurement value of the target data, and send the feedback information to the transmit end based on the measurement value, so that the transmit end can determine, based on the feedback information, whether the target data needs to be retransmitted. Compared with the prior art, in the embodiments of the present disclosure, the receive end does not need to check the target data before sending the feedback information to the transmit end. Therefore, a total time for sending the feedback information is reduced and a consumed TTI is shorter. Therefore, a low-latency service requirement can be met.

BRIEF DESCRIPTION OF DRAWINGS

FIG. 1-2 is a schematic diagram of data transmission in the prior art;

FIG. 2 is a flowchart of a hybrid automatic repeat request feedback method according to an embodiment of the present disclosure;

FIG. 3-1 is a flowchart of a hybrid automatic repeat request feedback method according to an embodiment of the present disclosure;

FIG. 3-2 is a flowchart of determining a measurement value of target data by a receive end according to an embodiment of the present disclosure;

DESCRIPTION OF EMBODIMENTS

To make the objectives, technical solutions, and advantages of this application clearer, the following further describes the implementations of this application in detail with reference to the accompanying drawings.

Figure 1:
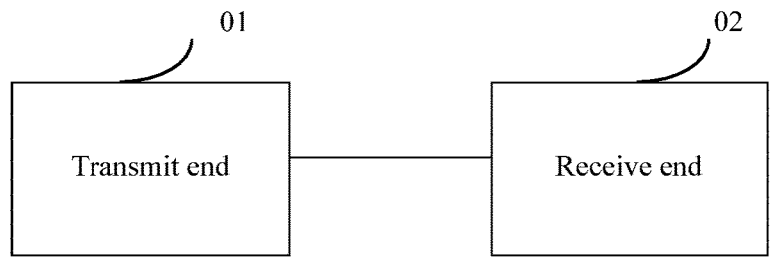
FIG. 1-1 is a schematic diagram of an implementation environment according to various embodiments of the present disclosure.

FIG. 1-1 is a schematic diagram of an implementation environment according to various embodiments of the present disclosure. The implementation environment may include a transmit end 01 and a receive end 02. The transmit end 01 and the receive end 02 transmit data by using a HARQ feedback technology. For example, the transmit end 01 may be a base station (BS), or may be user equipment (UE), or may be another device that supports the HARQ feedback technology. The receive end 02 may be a device that supports the HARQ feedback technology, such as a BS or UE. In the embodiments of the present disclosure, data to be transmitted is data to be transmitted at a physical layer of a device. A standard of a communications system is not limited in the embodiments of the present disclosure.

Figures 1, 2:
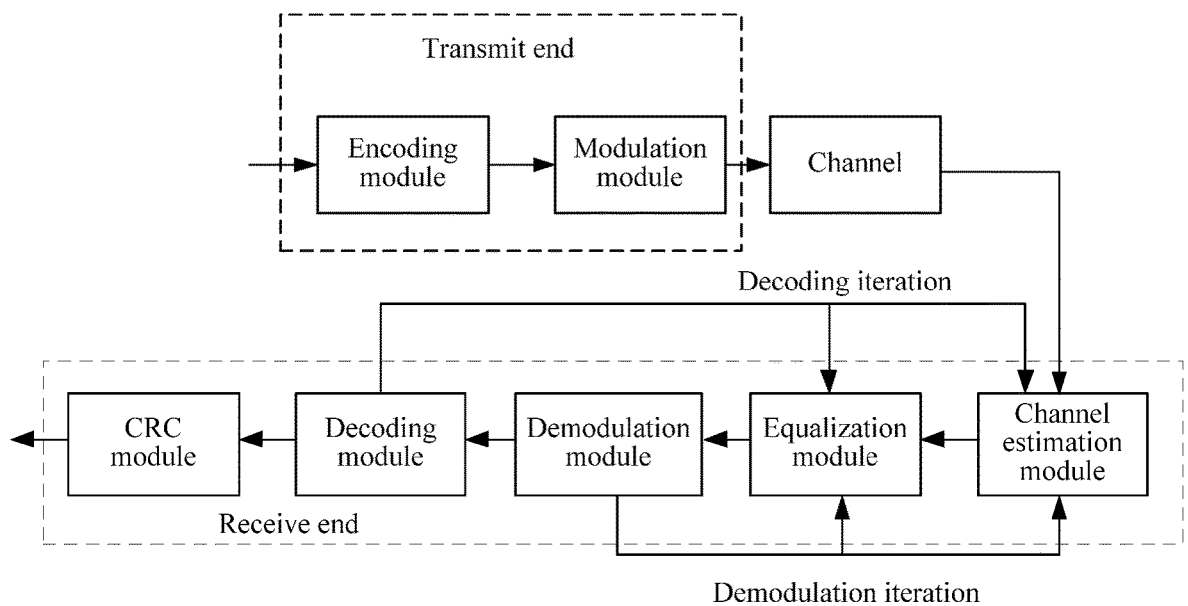
Figure 2:
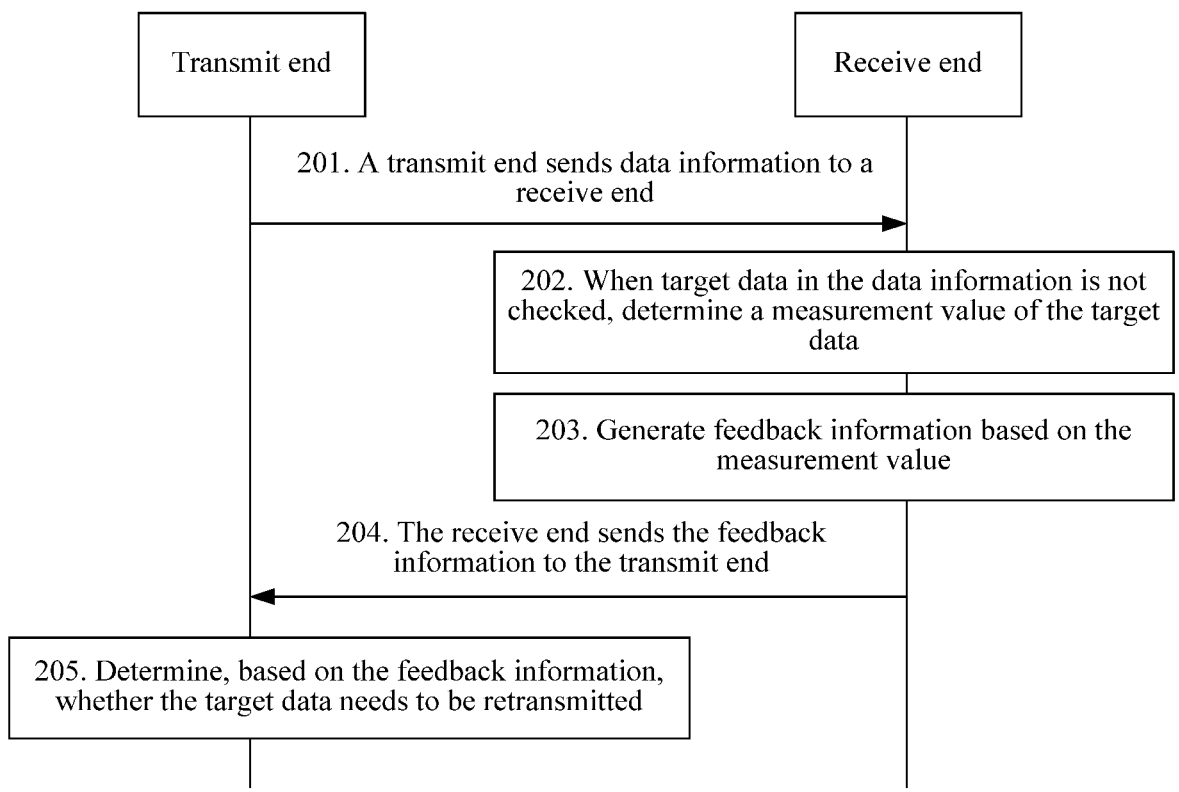

As shown in FIG. 1-2, data to be transmitted is sequentially processed by an encoding module and a modulation module, and processed data is output through a channel to a channel estimation module. The channel estimation module processes the data and outputs the data to an equalization module. The equalization module performs channel estimation and data compensation, and then outputs the data to a demodulation module. The demodulation module demodulates the data, and then outputs processed data to a decoding module. The decoding module outputs the data to a CRC module. The CRC module checks the data, and sends feedback information to the transmit end. The demodulation module may feed back a processing result to the equalization module and the channel estimation module, to complete demodulation iteration. The decoding module may feed back the processing result to the equalization module and the channel estimation module, to complete decoding iteration. The data processed by the modulation module may alternatively be processed by another module, and processed data is then transmitted to the channel estimation module through a channel.

For functions of modules between the transmit end and the receive end, refer to the prior art. Details are not described again in the embodiments of the present disclosure.

In the embodiments of the present disclosure, after receiving data information (where the data information includes target data) sent by the transmit end (for example, UE), the receive end (for example, a BS) may determine, when the target data in the data information is not checked, a measurement value of the target data. The measurement value is used to indicate reliability of a physical channel for transmitting the target data. The receive end may generate feedback information (where the feedback information carries an ACK or a NACK) based on the measurement value, and send the feedback information to the transmit end. The transmit end then determines, based on the feedback information, whether the target data needs to be retransmitted. For example, when the feedback information carries the ACK, the transmit end determines that the target data has been successfully sent, and new data may be sent; or when the feedback information carries the NACK, the transmit end determines that the target data needs to be retransmitted. In this process, the receive end does not need to check the target data and a consumed transmission time interval (TTI) is shorter. Therefore, a low-latency service requirement can be met.

FIG. 2 is a flowchart of a hybrid automatic repeat request feedback method according to an embodiment of the present disclosure. The method may be applied to the implementation environment shown in FIG. 1-1. As shown in FIG. 2, the method may include the following operations.

Operation 201. A transmit end sends data information to a receive end.

The data information includes target data. The transmit end may be UE, or may be a BS. For example, when the transmit end is UE, and the receive end is a BS, the UE sends the data information to the BS.

Operation 202. When target data in the data information is not checked, the receive end determines a measurement value of the target data.

The measurement value is used to indicate reliability of a physical channel for transmitting the target data. For example, the measurement value may be a value of accumulated conditional mutual information (ACMI) of a signal-to-noise ratio of the physical channel, information statistics of the data information, a signal-to-interference-plus-noise ratio of the physical channel, and the like.

Operation 203. The receive end generates feedback information based on the measurement value.

The feedback information carries an ACK or a NACK. For example, when the feedback information carries the ACK, it indicates that the target data has been successfully sent, and the transmit end may send new data to the receive end; or when the feedback information carries the NACK, it indicates that the transmit end needs to retransmit the target data.

Operation 204. The receive end sends the feedback information to the transmit end.

After generating the feedback information based on the measurement value, the receive end sends the feedback information to the transmit end.

Operation 205. The transmit end determines, based on the feedback information, whether the target data needs to be retransmitted.

Because the feedback information carries the ACK or the NACK, the transmit end can determine, based on the feedback information, whether the target data needs to be retransmitted.

In conclusion, in the hybrid automatic repeat request feedback method provided in this embodiment of the present disclosure, the receive end can determine, when the target data in the data information is not checked, the measurement value of the target data, and send the feedback information to the transmit end based on the measurement value, so that the transmit end can determine, based on the feedback information, whether the target data needs to be retransmitted. Compared with the prior art, in this embodiment of the present disclosure, the receive end does not need to check the target data before sending the feedback information to the transmit end. Therefore, a total time for sending the feedback information is reduced and a consumed TTI is shorter. Therefore, a low-latency service requirement can be met.

Figures 1, 3:
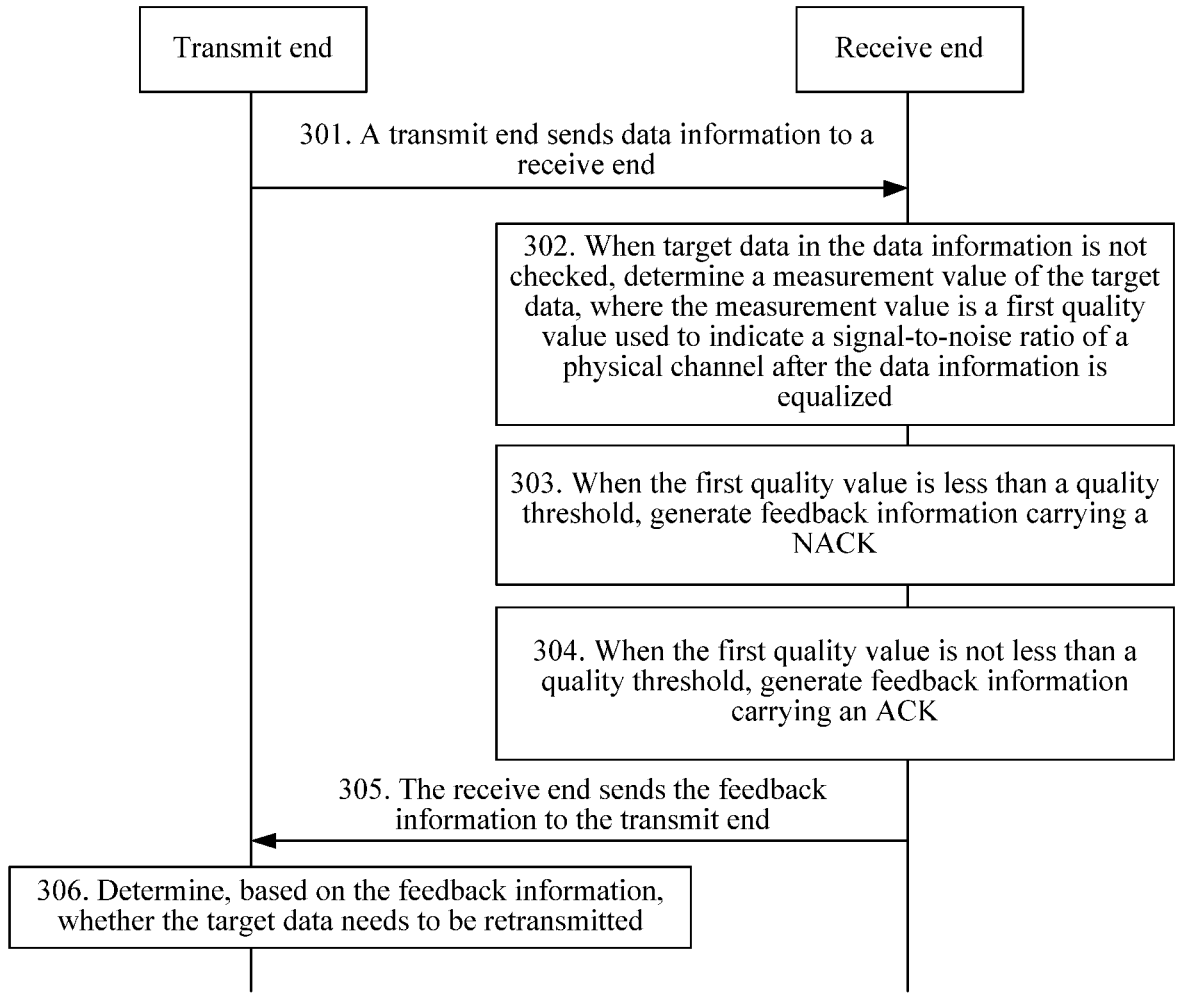
Figures 2, 3:
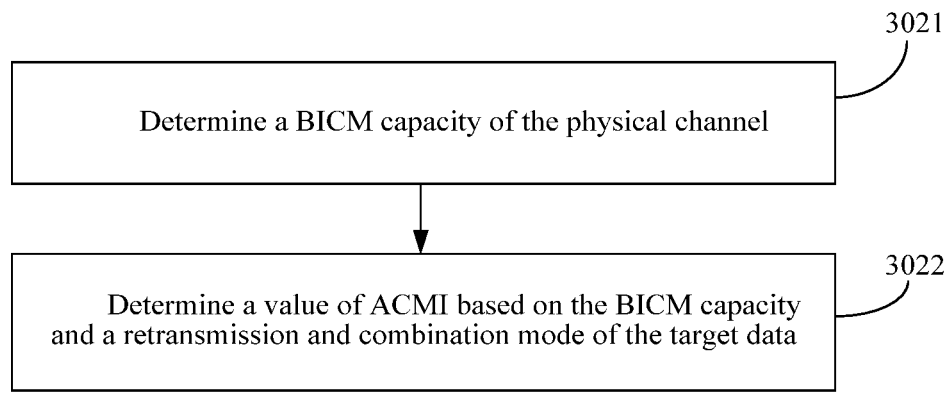

FIG. 3-1 is a flowchart of a hybrid automatic repeat request feedback method according to an embodiment of the present disclosure. The method may be applied to the implementation environment shown in FIG. 1-1. As shown in FIG. 3-1, the method may include the following operations.

Operation 301. A transmit end sends data information to a receive end. Operation 302 is performed.

The data information includes target data. The transmit end may be UE, or may be a BS. When the transmit end is UE, the receive end is a BS. When the transmit end is a BS, the receive end is UE.

Operation 302. When target data in the data information is not checked, the receive end determines a measurement value of the target data, where the measurement value is a first quality value used to indicate a signal-to-noise ratio of a physical channel after the data information is equalized.

The measurement value is used to indicate reliability of the physical channel for transmitting the target data. For example, the measurement value may be the first quality value used to indicate the signal-to-noise ratio of the physical channel after the data information is equalized.

For example, the first quality value may be a value of ACMI. The ACMI is a type of channel quality information. For descriptions of the ACMI, refer to the prior art.

Correspondingly, as shown in FIG. 3-2, operation 302 may include the following operations.

Operation 3021. Determine a BICM capacity of the physical channel.

The receive end may determine a BICM capacity of the physical channel for currently transmitting data according to a formula (1):

$$C_\chi(SNR) = L - \int_{v \in C} \frac{e^{-|v|^2}}{\pi 2^L} \sum_{x \in \chi} \sum_{l=1}^{L} \log_2 \left( 1 + \frac{\sum_{\hat{x} \in \chi : B_l(\hat{x})=1-B_l(x)} e^{-|\sqrt{SNR}(x-\hat{x})+v|^2}}{\sum_{\hat{x} \in \chi : B_l(\hat{x})=B_l(x)} e^{-|\sqrt{SNR}(x-\hat{x})+v|^2}} \right) dv \quad (1)$$

where $C_\chi(SNR)$ represents the BICM capacity, $\chi$ represents a modulation constellation diagram, SNR represents the signal-to-noise ratio of the physical channel, L represents a quantity of bits included in a modulation symbol of the target data, v represents noise, $B_l(x)$ represents an $l^{th}$ bit of a symbol x, $\hat{x}$ represents an assumed transmit symbol, $B_l(\hat{x})$ represents an $l^{th}$ bit of the symbol $\hat{x}$, $1 \le l \le L$, and C is a sum of v and x, and represents a signal including noise. SNR at the right side of the equal sign in the formula (1) needs to be estimated, and the remaining variables are known. For a specific process of determining the BICM capacity by using the formula (1) and a specific process of estimating SNR, refer to the prior art. Details are not described in this embodiment of the present disclosure.

Further, to simplify the calculation process, $$\sum_{\hat{x} \in \chi: B_l(\hat{x})=1-B_l(x)} e^{-|\sqrt{SNR}(x-\hat{x})+v|^2} \text{ and } \sum_{\hat{x} \in \chi: B_l(\hat{x})=B_l(x)} e^{-|\sqrt{SNR}(x-\hat{x})+v|^2}$$

in the formula (1) may be simplified by using a max-log-maximum a posteriori probability (that is, Max-Log-MAP) algorithm:

$$\sum_{\hat{x} \in \chi: B_l(\hat{x})=1-B_l(x)} e^{-|\sqrt{SNR}(x-\hat{x})+v|^2} \approx \max_{\hat{x} \in \chi: B_l(\hat{x})=1-B_l(x)} e^{-|\sqrt{SNR}(x-\hat{x})+v|^2}, \text{ and}$$

$$\sum_{\hat{x} \in \chi: B_l(\hat{x})=B_l(x)} e^{-|\sqrt{SNR}(x-\hat{x})+v|^2} \approx \max_{\hat{x} \in \chi: B_l(\hat{x})=B_l(x)} e^{-|\sqrt{SNR}(x-\hat{x})+v|^2},$$

and therefore, the formula (1) may be simplified as follows:

$$C_\chi(SNR) = L - \int_{v \in C} \frac{e^{-|v|^2}}{\pi 2^L} \sum_{x \in \chi} \sum_{l=1}^{L} \log_2 \left( 1 + \frac{\max_{\hat{x} \in \chi: B_l(\hat{x})=1-B_l(x)} e^{-|\sqrt{SNR}(x-\hat{x})+v|^2}}{\max_{\hat{x} \in \chi: B_l(\hat{x})=B_l(x)} e^{-|\sqrt{SNR}(x-\hat{x})+v|^2}} \right) dv \quad (2)$$

where $C_\chi(SNR)$ represents the BICM capacity, $\chi$ represents a modulation constellation diagram, SNR represents the signal-to-noise ratio of the physical channel, L represents a quantity of bits included in a modulation symbol of the target data, v represents noise, $B_l(x)$ represents an $l^{th}$ bit of a symbol x, $\hat{x}$ represents an assumed transmit symbol, $B_l(\hat{x})$ represents an $l^{th}$ bit of the symbol $\hat{x}$, and C is a sum of v and x, and represents a signal including noise. SNR at the right side of the equal sign in the formula (2) needs to be estimated, and the remaining variables are known. For the Max-Log-MAP algorithm, refer to the prior art.

Operation 3022. Determine a value of ACMI based on the BICM capacity and a retransmission and combination mode of the target data.

Optionally, the retransmission and combination mode of the target data is a chase combining (CC) mode or an incremental redundancy (IR) combination mode. When the retransmission and combination mode of the target data is the CC mode, the value of the ACMI may be determined by using a formula (3):

$$ACMI_{CC} = C_\chi \left( \sum_{k=1}^{K} SNR_k \right) \quad (3)$$

where K represents a quantity of retransmissions of the target data, $1 \le k \le K$, SNR represents the signal-to-noise ratio of the physical channel, and $\chi$ represents a modulation constellation diagram.

When the retransmission and combination mode of the target data is the IR combination mode, the value of the ACMI may be determined by using a formula (4):

$$ACMI_{IR} = \sum_{k=1}^{K} C_\chi(SNR_k) \quad (4)$$

where K represents a quantity of retransmissions of the target data, $1 \le k \le K$, SNR represents the signal-to-noise ratio of the physical channel, and $\chi$ represents a modulation constellation diagram.

Operation 303. When the first quality value is less than a quality threshold, the receive end generates the feedback information carrying the NACK. Operation 305 is performed.

The quality threshold is determined based on at least one of a coding scheme, a code block length, and a bit rate of the target data.

For example, the quality threshold may be a symbol transmission rate of the target data. The symbol transmission rate of the target data may be calculated based on the bit rate and the symbol bit quantity by using a formula (5):

$$R_1 = L \cdot N_a / N_c \quad (5)$$

where $R_1$ represents the symbol transmission rate of the target data, L represents the symbol bit quantity of the target data, $N_a$ represents an information bit quantity of the target data, $N_c$ represents a bit quantity after the target data is encoded, and $N_a/N_c$ represents a bit rate of a transport block on the physical channel.

For example, when the retransmission and combination mode of the target data is the CC mode, if $ACMI_{CC} < R_1$, the receive end generates the feedback information carrying the NACK, where $R_1$ represents the symbol transmission rate of the target data, and $ACMI_{CC}$ is ACMI when the retransmission and combination mode of the target data is the CC mode.

When the retransmission and combination mode of the target data is the IR combination mode, if $ACMI_{IR} < R_1$, the receive end generates the feedback information carrying the NACK, where $R_1$ represents the symbol transmission rate of the target data, and $ACMI_{IR}$ is ACMI when the retransmission and combination mode of the target data is the IR combination mode.

Operation 304. When the first quality value is not less than a quality threshold, the receive end generates the feedback information carrying the ACK. Operation 305 is performed.

For example, when the retransmission and combination mode of the target data is the CC mode, if $ACMI_{CC} \ge R_1$, the receive end generates the feedback information carrying the ACK, where $R_1$ represents the symbol transmission rate of the target data, and $ACMI_{CC}$ is ACMI when the retransmission and combination mode of the target data is the CC mode.

When the retransmission and combination mode of the target data is the IR combination mode, if $ACMI_{IR} \ge R_1$, the receive end generates the feedback information carrying the ACK, where $R_1$ represents the symbol transmission rate of the target data, and $ACMI_{IR}$ is ACMI when the retransmission and combination mode of the target data is the IR combination mode.

To further improve accuracy of a determining result, in another implementable manner, when the retransmission and combination mode of the target data is the CC mode, if $\alpha \cdot ACMI_{CC} < R_1$, the receive end generates the feedback information carrying the NACK. If $\alpha \cdot ACMI_{CC} \geq R_1$, the receive end generates the feedback information carrying the ACK. When the retransmission and combination mode of the target data is the IR combination mode, if $\alpha \cdot ACMI_{IR} \geq R_1$, the receive end generates the feedback information carrying the NACK. If $\alpha \cdot ACMI_{IR} \geq R_1$, the receive end generates the feedback information carrying the ACK. A value of an adjustment factor $\alpha$ may be adjusted based on an actual application, a default value of $\alpha$ is 1, and $\alpha$ may be slightly less than 1.

It should also be noted that, there is no sequential order of operation 303 and operation 304, and operation 303 and operation 304 are different parallel processing manners. After operation 302 is performed, operation 303 or operation 304 is performed.

Operation 305. The receive end sends the feedback information to the transmit end. Operation 306 is performed.

After generating the feedback information carrying the ACK or a NACK, the receive end sends the feedback information to the transmit end, so that the transmit end determines, based on the feedback information, whether the target data needs to be retransmitted.

For example, when the retransmission and combination mode of the target data is the CC mode, if $ACMI_{CC} < R_1$, the receive end generates the feedback information carrying the NACK and sends the feedback information carrying the NACK to the transmit end, and the transmit end determines, based on the NACK in the feedback information, that the target data needs to be retransmitted to the receive end.

Operation 306. The transmit end determines, based on the feedback information, whether the target data needs to be retransmitted.

The transmit end determines, based on the feedback information, whether the target data needs to be retransmitted to the receive end. When the target data needs to be retransmitted, the transmit end resends the target data to the receive end. When the target data does not need to be retransmitted, the transmit end sends new data to the receive end.

In this embodiment of the present disclosure, the receive end renders a non-check decision on the received target data by using the ACMI, so that the receive end does not need to check the target data before sending the information to the transmit end. Therefore, a total time for sending the feedback information by the receive end is reduced and a consumed TTI is shorter. Therefore, a low-latency service requirement can be met.

In conclusion, in the hybrid automatic repeat request feedback method provided in this embodiment of the present disclosure, the receive end can determine, when the target data in the data information is not checked, the measurement value of the target data, and send the feedback information to the transmit end based on the measurement value, so that the transmit end can determine, based on the feedback information, whether the target data needs to be retransmitted, where the measurement value is the ACMI. Compared with the prior art, in this embodiment of the present disclosure, the receive end does not need to check the target data before sending the feedback information to the transmit end. Therefore, a total time for sending the feedback information by the receive end is reduced and a consumed TTI is shorter. Therefore, a low-latency service requirement can be met.

Figure 4:
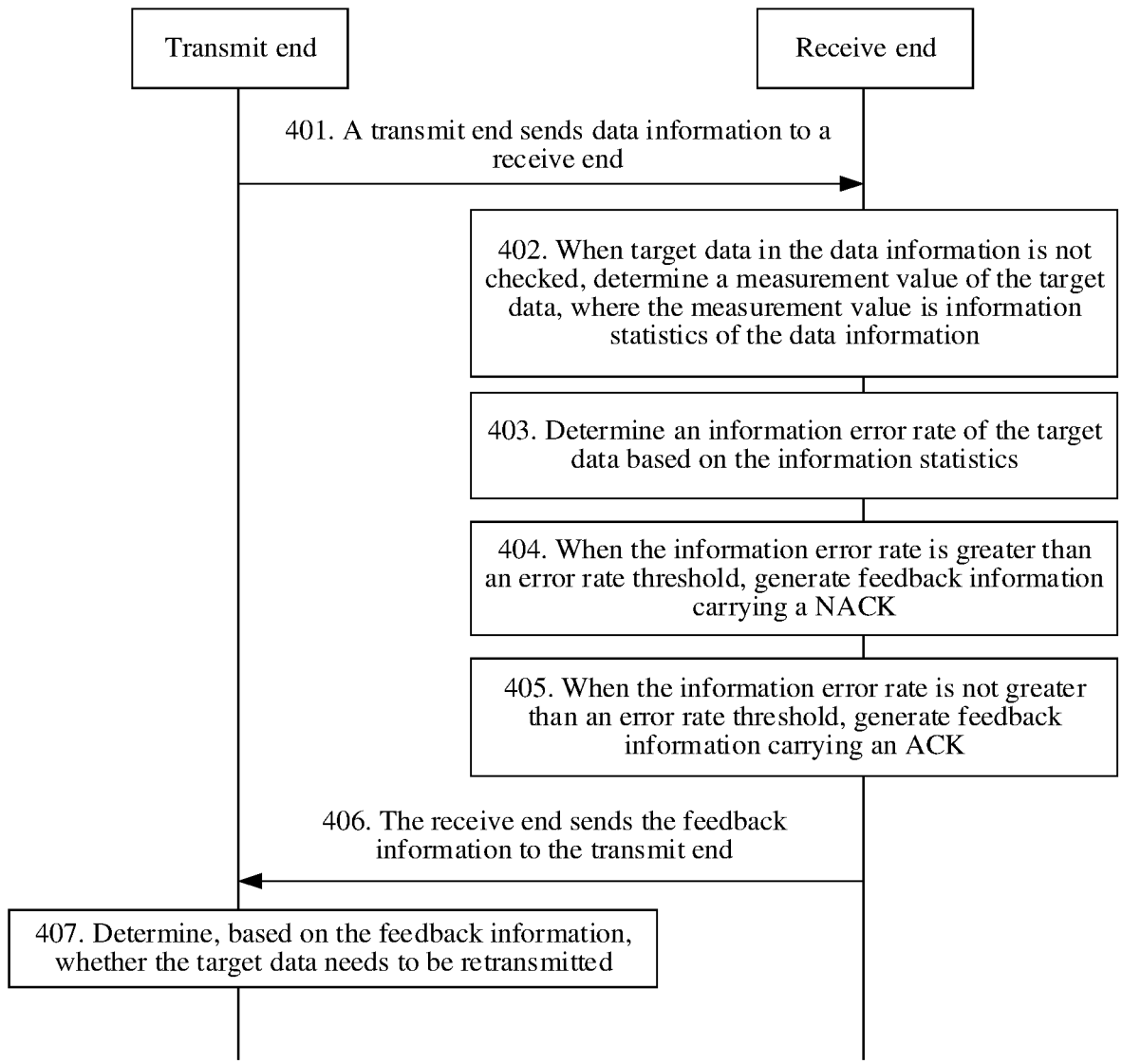
FIG. 4 is a flowchart of a hybrid automatic repeat request feedback method according to an embodiment of the present disclosure.

FIG. 4 is a flowchart of a hybrid automatic repeat request feedback method according to an embodiment of the present disclosure. The method may be applied to the implementation environment shown in FIG. 1-1. As shown in FIG. 4, the method may include the following operations.

Operation 401. A transmit end sends data information to a receive end. Operation 402 is performed.

The data information includes target data. The transmit end may be UE, or may be a BS. When the transmit end is UE, the receive end is a BS. When the transmit end is a BS, the receive end is UE.

Operation 402. When target data in the data information is not checked, the receive end determines a measurement value of the target data, where the measurement value is information statistics of the data information. Operation 403 is performed.

The measurement value is used to indicate reliability of a physical channel for transmitting the target data. For example, the measurement value may be information statistics of the data information.

For example, the information statistics may be information statistics (that is, a demodulation soft value) after the data information is demodulated, or the information statistics may be information statistics (that is, a decoding soft value) after the data information is decoded.

That the information statistics are information statistics after the data information is demodulated is used as an example for description. The information statistics after the data information is demodulated are also referred to as a log-likelihood ratio (LLR) demodulation soft value. The LLR demodulation soft value is expressed by a formula (6):

$$\tilde{u}_k = \log \frac{P(u_k = +1 \mid y)}{P(u_k = -1 \mid y)} \quad (6)$$

where $\tilde{u}_k$ represents an LLR demodulation soft value of a bit $u_k$, $u_k$ represents a bit obtained after the transmit end encodes the target data, $P(u_k=+1|y)$ represents a probability that received $u_k=+1$ after the receive end receives a bit y, and $P(u_k=-1|y)$ represents a probability that the received $u_k=-1$ after the receive end receives the bit y. For the formula (6), refer to the prior art.

Operation 403. The receive end determines an information error rate of the target data based on the information statistics.

For example, the information error rate is a code word error rate or an average bit error rate. The average bit error rate refers to an average value of all bit error probabilities within one transport block.

When the information error rate is a code word error rate, the receive end may determine the code word error rate of the target data by using a formula (7):

$$P_\omega \approx 1 - \prod_{k=1}^{Z}\left(1 - \frac{1}{1+e^{|\tilde{u}_k|}}\right) = 1 - \prod_{k=1}^{Z} \frac{1}{1+e^{-|\tilde{u}_k|}} \quad (7)$$

where $P_\omega$ represents the code word error rate, Z represents a length of a transmitted code word, $1 \leq k \leq Z$, and $\tilde{u}_k$ represents the LLR demodulation soft value of the bit $u_k$.

When the information error rate is an average bit error rate, the receive end may determine the average bit error rate of the target data by using a formula (8):

$$P_b = \frac{1}{Z}\sum_{k=1}^{Z} P_{b,k} = \frac{1}{Z}\sum_{k=1}^{Z} \frac{1}{1+e^{|\tilde{u}_k|}} \quad (8)$$

where $P_b$ represents the average bit error rate, Z represents a length of a transmitted code word, 1≤k≤Z, and $ũ_k$ represents the LLR demodulation soft value of the bit $u_k$.

Operation 404. When the information error rate is greater than an error rate threshold, the receive end generates the feedback information carrying the NACK. Operation 406 is performed.

The error rate threshold may be determined based on at least one of a coding scheme, a code block length, and a bit rate of the target data.

In addition, the error rate threshold may alternatively be set based on a parameter such as a TBS on the physical channel. For a specific setting process, refer to the prior art. Details are not described herein again.

For example, when the information error rate is a code word error rate, if $P_ω>P_{ω,t}$, the receive end generates the feedback information carrying the NACK, where $P_ω$ represents the code word error rate, and $P_{ω,t}$ represents a preset error rate threshold corresponding to the code word error rate.

When the information error rate is an average bit error rate, if $P_b>P_{b,t}$, the receive end generates the feedback information carrying the NACK, where $P_b$ represents the average bit error rate, and $P_{b,t}$ represents a preset threshold corresponding to the average bit error rate.

Operation 405. When the information error rate is not greater than an error rate threshold, the receive end generates the feedback information carrying the ACK. Operation 406 is performed.

When the information error rate is a code word error rate, if $P_ω≤P_{ω,t}$, the receive end generates the feedback information carrying the ACK, where $P_ω$ represents the code word error rate, and $P_{ω,t}$ represents a preset error rate threshold corresponding to the code word error rate.

When the information error rate is an average bit error rate, if $P_b≤P_{b,t}$, the receive end generates the feedback information carrying the ACK, where $P_b$ represents the average bit error rate, and $P_{b,t}$ represents a preset error rate threshold corresponding to the average bit error rate.

It should also be noted that, there is no sequential order of operation 404 and operation 405, and operation 404 and operation 405 are different parallel processing manners. After operation 403 is performed, operation 404 or operation 405 is performed.

Operation 406. The receive end sends the feedback information to the transmit end. Operation 407 is performed.

After generating the feedback information carrying the ACK or a NACK, the receive end sends the feedback information to the transmit end, so that the transmit end determines, based on the feedback information, whether the target data needs to be retransmitted.

For example, when the information error rate is a code word error rate, if $P_ω≤P_{ω,t}$, the receive end generates the feedback information carrying the ACK, and sends the feedback information carrying the ACK to the transmit end. The transmit end determines, based on the ACK in the feedback information, that the target data does not need to be retransmitted to the receive end. Instead, the transmit end sends new data to the receive end.

Operation 407. The transmit end determines, based on the feedback information, whether the target data needs to be retransmitted.

The transmit end determines, based on the feedback information, whether the target data needs to be retransmitted to the receive end. When the target data needs to be retransmitted, the transmit end resends the target data to the receive end. When the target data does not need to be retransmitted, the transmit end sends new data to the receive end.

In this embodiment of the present disclosure, the receive end renders a non-check decision on the received target data based on the information error rate (for example, the code word error rate or the average bit error rate). In this case, the receive end does not need to check the target data before sending the feedback information to the transmit end. Therefore, a total time for sending the feedback information by the receive end is reduced, and a consumed TTI is shorter. Therefore, a low-latency service requirement can be met.

In conclusion, in the hybrid automatic repeat request feedback method provided in this embodiment of the present disclosure, the receive end can determine, when the target data in the data information is not checked, the measurement value of the target data, and send the feedback information to the transmit end based on the measurement value, so that the transmit end can determine, based on the feedback information, whether the target data needs to be retransmitted, where the measurement value is the information error rate. Compared with the prior art, in this embodiment of the present disclosure, the receive end does not need to check the target data before sending the feedback information to the transmit end. Therefore, a total time for sending the feedback information by the receive end is reduced and a consumed TTI is shorter. Therefore, a low-latency service requirement can be met.

Figure 5:
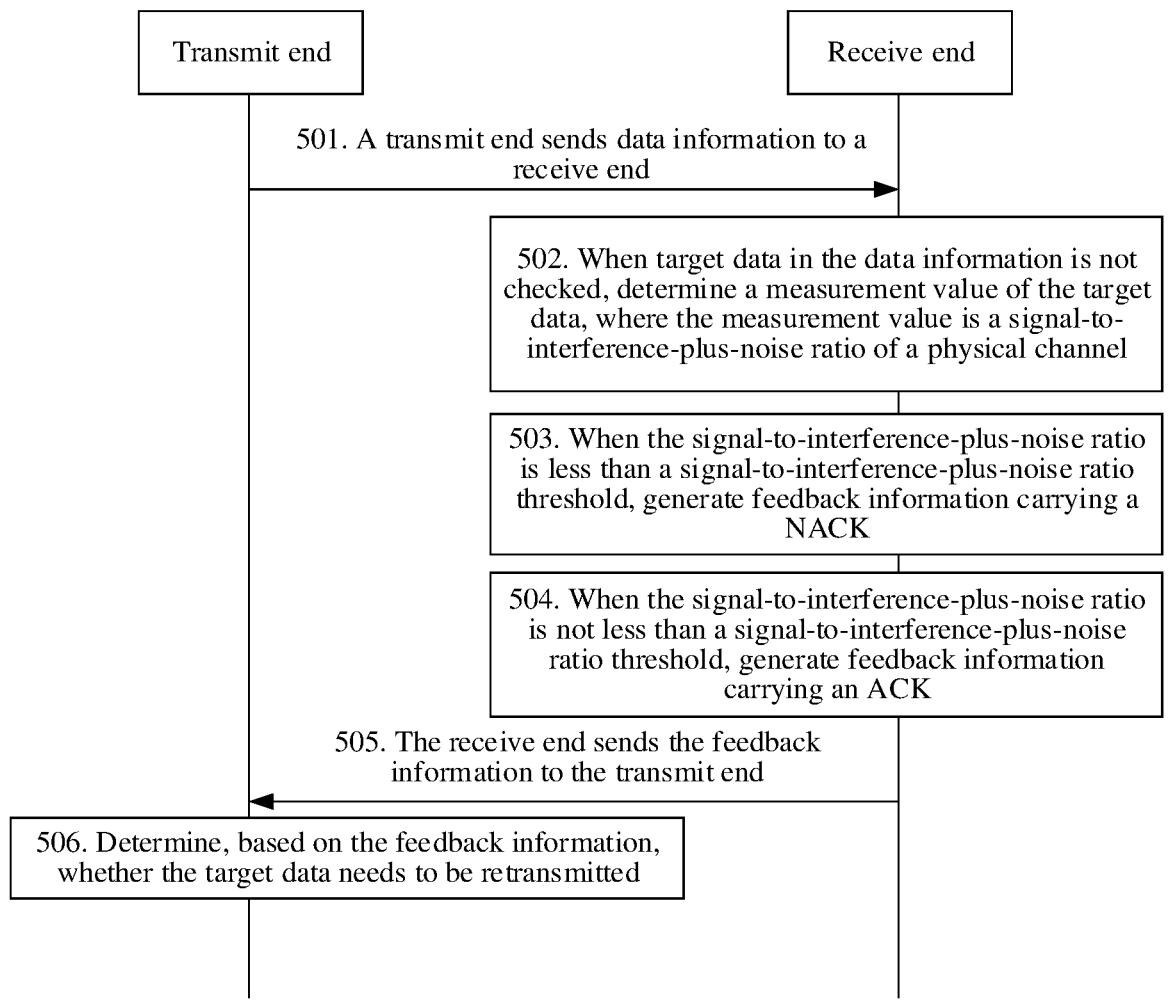
FIG. 5 is a flowchart of a hybrid automatic repeat request feedback method according to an embodiment of the present disclosure.

FIG. 5 is a flowchart of a hybrid automatic repeat request feedback method according to an embodiment of the present disclosure. The method may be applied to the implementation environment shown in FIG. 1-1. As shown in FIG. 5, the method may include the following operations.

Operation 501. A transmit end sends data information to a receive end. Operation 502 is performed.

The data information includes target data. The transmit end may be UE, or may be a BS. When the transmit end is UE, the receive end is a BS. When the transmit end is a BS, the receive end is UE.

Operation 502. When target data in the data information is not checked, the receive end determines a measurement value of the target data, where the measurement value is a signal-to-interference-plus-noise ratio of a physical channel.

The measurement value is used to indicate reliability of the physical channel for transmitting the target data. For example, the measurement value may be the signal-to-interference-plus-noise ratio of the physical channel.

For example, the signal-to-interference-plus-noise ratio may be a signal-to-interference-plus-noise ratio of the physical channel before the data information is equalized, or the signal-to-interference-plus-noise ratio may be a signal-to-interference-plus-noise ratio of the physical channel after the data information is equalized.

On one hand, when the signal-to-interference-plus-noise ratio is a signal-to-interference-plus-noise ratio of the physical channel before the data information is equalized, the receive end may determine the signal-to-interference-plus-noise ratio by using formulas (9) to (12). A channel estimation value is first calculated by using the formula (9):

$$\hat{h} = \frac{1}{Nc} \sum_{l=0}^{Nc-1} y_l * a_l^* \qquad (9)$$

where ĥ represents the channel estimation value, Nc represents a subcarrier quantity, $0 \leq l \leq N_C-1$, $y_l$ represents a pilot frequency location symbol in channel estimation, $\alpha_l$ represents a pilot frequency symbol, and $\alpha^*_l$ represents a conjugate value of the pilot frequency symbol $\alpha_l$.

A noise estimation value of the physical channel is then calculated by using the formula (10):

$$\hat{\sigma}^2 = \frac{1}{N_c - 1} \sum_{l=0}^{N_c-1} |y_l - \hat{h}|^2 \tag{10}$$

where $\hat{\sigma}^2$ represents the noise estimation value of the physical channel, $N_C$ represents the subcarrier quantity, $0 \leq l \leq N_C-1$, $y_l$ represents the pilot frequency location symbol in channel estimation, and ĥ represents the channel estimation value.

Subsequently, a power estimation value of a symbol output by a channel estimation module is calculated by using the formula (11):

$$\hat{E}s = \left| \frac{1}{N_c} \sum_{l=0}^{N_c-1} y_l \right|^2 - \frac{1}{N_c} \hat{\sigma}^2 \tag{11}$$

where $\hat{E}_S$ represents the power estimation value of the symbol, $N_C$ represents the subcarrier quantity, $0 \leq l \leq N_C-1$, $y_l$ represents the pilot frequency location symbol in channel estimation, and $\hat{\sigma}^2$ represents the noise estimation value of the physical channel.

Finally, the signal-to-interference-plus-noise ratio of the physical channel before the data information is equalized is calculated by using the formula (12):

$$SINR_1 = \frac{\hat{E}s}{\hat{\sigma}^2} \tag{12}$$

where $SINR_1$ represents the signal-to-interference-plus-noise ratio of the physical channel before the data information is equalized, $\hat{E}_S$ represents the power estimation value of the symbol, and $\hat{\sigma}^2$ represents the noise estimation value of the physical channel.

On the other hand, when the signal-to-interference-plus-noise ratio is a signal-to-interference-plus-noise ratio of the physical channel after the data information is equalized, for example, for a single carrier frequency division multiple access (SC-FDMA) system, the receive end may calculate the signal-to-interference-plus-noise ratio by using a formula (13):

$$SINR_{SC-FDMA} = \frac{\rho}{1 - \rho} \tag{13}$$

where $SINR_{SC-FDMA}$ represents the signal-to-interference-plus-noise ratio of the physical channel after the data information is equalized, and $\rho$ represents an equivalent channel factor of a time domain after the data information is equalized.

For example, for an orthogonal frequency division multiplexing (OFDM) system, the receive end may calculate the signal-to-interference-plus-noise ratio by using a formula (14):

$$SINR_{OFDM} = \frac{|\omega^H H|^2}{\omega^H R_u \omega} \tag{14}$$

where $SINR_{OFDM}$ represents the signal-to-interference-plus-noise ratio of the physical channel after the data information is equalized, ω represents a weighting coefficient on a subcarrier for transmitting the data information, H represents a channel factor on the subcarrier, and $R_u$ represents an estimated interference noise correlation matrix.

Operation 503. When the signal-to-interference-plus-noise ratio is less than a signal-to-interference-plus-noise ratio threshold, the receive end generates the feedback information carrying the NACK. Operation 505 is performed.

The signal-to-interference-plus-noise ratio (SINR) threshold is determined based on at least one of a coding scheme, a code block length, and a bit rate of the target data. The signal-to-interference-plus-noise ratio threshold may be determined based on the signal-to-interference-plus-noise ratio, a modulation and coding scheme (MCS) table, and a block error rate (BLER) curve. In the prior art, during transmission of the target data, parameters such as the coding scheme and the bit rate of the target data are usually recorded by using an MCS table. The MCS table corresponds to a plurality of TBSs, and each TBS has a BLER curve. The receive end may set, based on the plurality of BLER curves, a signal-to-interference-plus-noise ratio threshold corresponding to the MCS table. The signal-to-interference-plus-noise ratio threshold is a threshold corresponding to the signal-to-interference-plus-noise ratio (where the signal-to-interference-plus-noise ratio is a signal-to-interference-plus-noise ratio of the physical channel before the data information is equalized, or a signal-to-interference-plus-noise ratio of the physical channel after the data information is equalized). For the MCS table and the BLER curve, refer to the prior art.

For example, when the signal-to-interference-plus-noise ratio (SINR) is a signal-to-interference-plus-noise ratio of the physical channel before the data information is equalized, if $SINR_1 < Threshold_{TBS}$, the receive end generates the feedback information carrying the NACK, where $SINR_1$ represents the signal-to-interference-plus-noise ratio of the physical channel before the data information is equalized, and $Threshold_{TBS}$ represents a signal-to-interference-plus-noise ratio threshold corresponding to the signal-to-interference-plus-noise ratio.

When the signal-to-interference-plus-noise ratio is a signal-to-interference-plus-noise ratio of the physical channel after the data information is equalized, using an SC-FDMA system as an example, if $SINR_{SC-FDMA} < Threshold_{TBS}$, the receive end generates the feedback information carrying the NACK, where $SINR_{SC-FDMA}$ represents the signal-to-interference-plus-noise ratio of the physical channel after the data information is equalized, and $Threshold_{TBS}$ represents a signal-to-interference-plus-noise ratio threshold corresponding to the signal-to-interference-plus-noise ratio.

Operation 504. When the signal-to-interference-plus-noise ratio is not less than a signal-to-interference-plus-noise ratio threshold, the receive end generates the feedback information carrying the ACK. Operation 505 is performed.

For example, when the signal-to-interference-plus-noise ratio is a signal-to-interference-plus-noise ratio of the physical channel before the data information is equalized, if $SINR_1 \geq Threshold_{TBS}$, the receive end generates the feedback information carrying the ACK, where $SINR_1$ represents the signal-to-interference-plus-noise ratio of the physical channel before the data information is equalized, and $Threshold_{TBS}$ represents a signal-to-interference-plus-noise ratio threshold corresponding to the signal-to-interference-plus-noise ratio.

When the signal-to-interference-plus-noise ratio is a signal-to-interference-plus-noise ratio of the physical channel after the data information is equalized, using an SC-FDMA system as an example, if $SINR_{SC\text{-}FDMA} \geq Threshold_{TBS}$, the receive end generates the feedback information carrying the ACK, where $SINR_{SC\text{-}FDMA}$ represents the signal-to-interference-plus-noise ratio of the physical channel after the data information is equalized, and $Threshold_{TBS}$ represents a signal-to-interference-plus-noise ratio threshold corresponding to the signal-to-interference-plus-noise ratio.

It should also be noted that, there is no sequential order of operation 503 and operation 504, and operation 503 and operation 504 are different parallel processing manners. After operation 502 is performed, operation 503 or operation 504 is performed.

Operation 505. The receive end sends the feedback information to the transmit end. Operation 506 is performed.

After generating the feedback information carrying the ACK or a NACK, the receive end sends the feedback information to the transmit end, so that the transmit end determines, based on the feedback information, whether the target data needs to be retransmitted.

For example, when the signal-to-interference-plus-noise ratio is a signal-to-interference-plus-noise ratio of the physical channel before the data information is equalized, if $SINR_1 < Threshold_{TBS}$, the receive end generates the feedback information carrying the NACK. The transmit end determines, based on the NACK in the feedback information, that the target data needs to be retransmitted to the receive end.

Operation 506. The transmit end determines, based on the feedback information, whether the target data needs to be retransmitted.

The transmit end determines, based on the feedback information, whether the target data needs to be retransmitted to the receive end. When the target data needs to be retransmitted, the transmit end resends the target data to the receive end. When the target data does not need to be retransmitted, the transmit end sends new data to the receive end.

In this embodiment of the present disclosure, the receive end renders a non-check decision on the received target data by using the signal-to-interference-plus-noise ratio of the physical channel. The signal-to-interference-plus-noise ratio may be a signal-to-interference-plus-noise ratio of the physical channel before the data information is equalized, or a signal-to-interference-plus-noise ratio of the physical channel after the data information is equalized. In this case, the receive end does not need to check the target data before sending the feedback information to the transmit end. Therefore, a total time for sending the feedback information by the receive end is reduced, and a consumed TTI is shorter. Therefore, a low-latency service requirement can be met.

In conclusion, in the hybrid automatic repeat request feedback method provided in this embodiment of the present disclosure, the receive end can determine, when the target data in the data information is not checked, the measurement value of the target data, and send the feedback information to the transmit end based on the measurement value, so that the transmit end can determine, based on the feedback information, whether the target data needs to be retransmitted, where the measurement value is the signal-to-interference-plus-noise ratio of the physical channel. Compared with the prior art, in this embodiment of the present disclosure, the receive end does not need to check the target data before sending the feedback information to the transmit end. Therefore, a total time for sending the feedback information is reduced and a consumed TTI is shorter. Therefore, a low-latency service requirement can be met.

Figure 6:
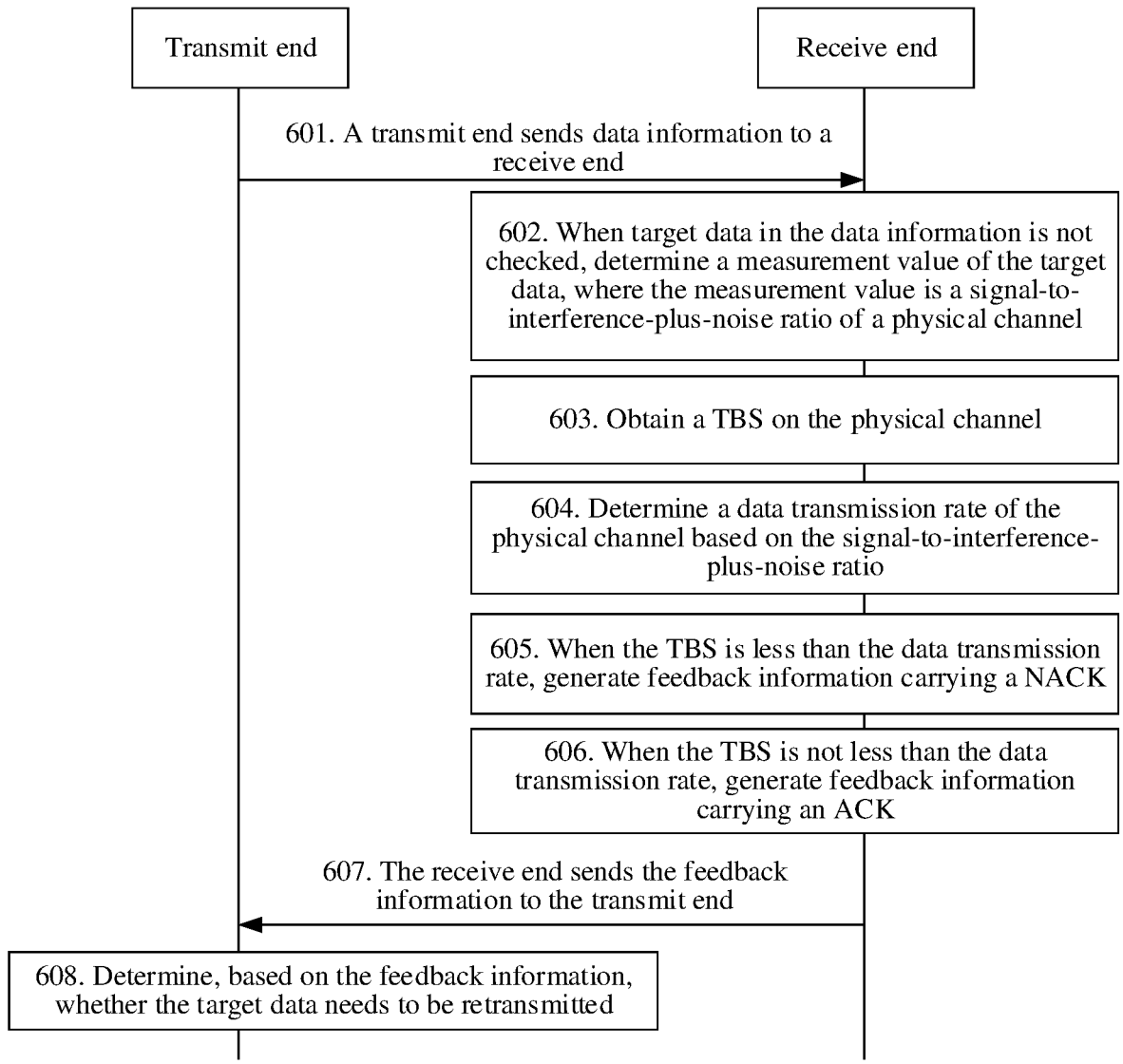
FIG. 6 is a flowchart of a hybrid automatic repeat request feedback method according to an embodiment of the present disclosure.

FIG. 6 is a flowchart of a hybrid automatic repeat request feedback method according to an embodiment of the present disclosure. The method may be applied to the implementation environment shown in FIG. 1-1. As shown in FIG. 6, the method may include the following operations.

Operation 601. A transmit end sends data information to a receive end. Operation 602 is performed.

The data information includes target data. The transmit end may be UE, or may be a BS. When the transmit end is UE, the receive end is a BS. When the transmit end is a BS, the receive end is UE.

Operation 602. When target data in the data information is not checked, the receive end determines a measurement value of the target data, where the measurement value is a signal-to-interference-plus-noise ratio of a physical channel. Operation 603 is performed.

The measurement value is used to indicate reliability of a physical channel for transmitting the target data. The measurement value may be the signal-to-interference-plus-noise ratio of the physical channel.

For example, the signal-to-interference-plus-noise ratio may be a signal-to-interference-plus-noise ratio of the physical channel before the data information is equalized, or a signal-to-interference-plus-noise ratio of the physical channel after the data information is equalized.

On one hand, when the signal-to-interference-plus-noise ratio is a signal-to-interference-plus-noise ratio of the physical channel before the data information is equalized, the receive end may determine the signal-to-interference-plus-noise ratio $SINR_1$ by using the foregoing formulas (9) to (12).

On the other hand, when the signal-to-interference-plus-noise ratio is a signal-to-interference-plus-noise ratio of the physical channel after the data information is equalized, for example, for an SC-FDMA system, the receive end may calculate the signal-to-interference-plus-noise ratio $SINR_{SC\text{-}FDMA}$ by using the formula (13); or for an OFDM system, the receive end may calculate the signal-to-interference-plus-noise ratio $SINR_{OFDM}$ by using the formula (14).

Operation 603. The receive end obtains a TBS on the physical channel. Operation 604 is performed.

For a specific process of obtaining the TBS on the physical channel by the receive end, refer to the prior art. Details are not described in this embodiment of the present disclosure.

Operation 604. The receive end determines a data transmission rate of the physical channel based on the signal-to-interference-plus-noise ratio.

For example, when the signal-to-interference-plus-noise ratio is a signal-to-interference-plus-noise ratio of the physical channel before the data information is equalized, the receive end may determine the data transmission rate of the physical channel by using a formula (15):

$$\text{Rate} = T_{symbol} * W * \min\left\{\beta_{max}, \log_2\left(1 + \frac{SINR_1}{\mu}\right)\right\} \quad (15)$$

where Rate represents the data transmission rate of the physical channel, $T_{symbol}$ represents duration of a symbol output by a channel estimation module, W represents a system bandwidth, $\beta_{max}$ represents a maximum spectral efficiency, a unit of the spectral efficiency is bit per second per hertz (bit/s/Hz), $SINR_1$ represents the signal-to-interference-plus-noise ratio of the physical channel before the data information is equalized, μ represents a backoff factor, and both $\beta_{max}$ and μ can be freely adjusted.

Operation 605. When the TBS is less than the data transmission rate, the receive end generates the feedback information carrying the NACK. Operation 607 is performed.

For example, when the signal-to-interference-plus-noise ratio is a signal-to-interference-plus-noise ratio of the physical channel before the data information is equalized, if TBS<Rate, the receive end generates the feedback information carrying the NACK, where TBS represents the transport block size on the physical channel, and Rate represents the data transmission rate of the physical channel.

Operation 606. When the TBS is not less than the data transmission rate, the receive end generates the feedback information carrying the ACK. Operation 607 is performed.

For example, when the signal-to-interference-plus-noise ratio is a signal-to-interference-plus-noise ratio of the physical channel before the data information is equalized, if TBS≥Rate, the receive end generates the feedback information carrying the ACK, where TBS represents the transport block size on the physical channel, and Rate represents the data transmission rate of the physical channel.

It should also be noted that, there is no sequential order of operation 605 and operation 606, and operation 605 and operation 606 are different parallel processing manners. After operation 604 is performed, operation 605 or operation 606 is performed.

Operation 607. The receive end sends the feedback information to the transmit end. Operation 608 is performed.

After generating the feedback information carrying the ACK or a NACK, the receive end sends the feedback information to the transmit end, so that the transmit end determines, based on the feedback information, whether the target data needs to be retransmitted.

For example, when the signal-to-interference-plus-noise ratio is a signal-to-interference-plus-noise ratio of the physical channel before the data information is equalized, if TBS<Rate, the receive end generates the feedback information carrying the NACK. The transmit end determines, based on the NACK in the feedback information, that the target data needs to be retransmitted to the receive end.

Operation 608. The transmit end determines, based on the feedback information, whether the target data needs to be retransmitted.

The transmit end determines, based on the feedback information, whether the target data needs to be retransmitted to the receive end. When the target data needs to be retransmitted, the transmit end resends the target data to the receive end. When the target data does not need to be retransmitted, the transmit end sends new data to the receive end.

In this embodiment of the present disclosure, the receive end renders a non-check decision on the received target data by using the TBS on the physical channel and the signal-to-interference-plus-noise ratio of the physical channel. The signal-to-interference-plus-noise ratio may be a signal-to-interference-plus-noise ratio of the physical channel before the data information is equalized, or a signal-to-interference-plus-noise ratio of the physical channel after the data information is equalized. In this method, the receive end does not need to check the target data before sending the feedback information to the transmit end. Therefore, a total time for sending the feedback information by the receive end is reduced, and a consumed TTI is shorter. Therefore, a low-latency service requirement can be met.

It should be noted that, a sequential order of the operations of the hybrid automatic repeat request feedback method provided in this embodiment of the present disclosure may be appropriately adjusted, an operation may be added or omitted based on a situation, and variations readily figured out by a person skilled in the art within the technical scope disclosed in this application shall fall within the protection scope of this application. Therefore, details are not described again.

In conclusion, in the hybrid automatic repeat request feedback method provided in this embodiment of the present disclosure, the receive end can determine, when the target data in the data information is not checked, the measurement value of the target data, and send the feedback information to the transmit end based on the measurement value, so that the transmit end can determine, based on the feedback information, whether the target data needs to be retransmitted, where the measurement value is the signal-to-interference-plus-noise ratio of the physical channel. Compared with the prior art, in this embodiment of the present disclosure, the receive end does not need to check the target data before sending the feedback information to the transmit end. Therefore, a total time for sending the feedback information is reduced and a consumed TTI is shorter. Therefore, a low-latency service requirement can be met.

It should also be noted that, the hybrid automatic repeat request feedback method provided in this embodiment of the present disclosure may be applied to iterative detection in the prior art, such as demodulation iteration and decoding iteration in a data transmission process, simplifying the detection process and improving accuracy of a detection result; or may be applied to a HARQ combination process, where HARQ combination refers to combination of retransmitted data and historical data. This method simplifies the combination process and improves check accuracy. For details, refer to FIG. 3-1. In addition, a standard of a communications system is not limited in this embodiment of the present disclosure.

For a current wireless communications system, to meet a low-latency service requirement, a shorter TTI is expected to be used. For example, for a 5G system, to reduce a latency, a TTI length of 0.1 millisecond is usually used. The TTI length is 1/10 a TTI length in an LTE system. Under the low-latency service requirement, the receive end needs to rapidly perform HARQ feedback. In the prior art, it is difficult to perform data retransmission, or data can be retransmission only once. This directly affects a HARQ gain (where the HARQ gain is a diversity gain obtained by combining demodulation information generated by independently transmitting same data a plurality of times).

In the prior art, after receiving data sent by the transmit end, the receive end sequentially decodes and performs a CRC on the data, and sends feedback information to the transmit end based on a check result. When the feedback information carries a NACK, it indicates that the transmit end needs to retransmit the data. In other words, the transmit end needs to resend previous data. Subsequently, the receive end combines the retransmitted data and historical data (that is, data sent last time), and then detects combined data, to complete the HARQ feedback. The receive end needs a relatively long time to complete the CRC and send the feedback information to the transmit end, and a consumed TTI is relatively long, resulting in a relatively long HARQ cycle and a relatively large quantity of HARQ processes (where the HARQ processes are used for controlling data transmission). Therefore, it is likely that the low-latency service requirement cannot be met. However, the hybrid automatic repeat request feedback method provided in this embodiment of the present disclosure is a HARQ retransmission mechanism based on a non-CRC. In this mechanism, HARQ feedback can be rapidly performed, so that data is rapidly retransmitted. In the method, a quantity of data retransmissions in a low-latency service scenario can be increased, demodulation information a plurality of times can be obtained, and the plurality of pieces of demodulation information can be combined to obtain a HARQ gain. The method meets the low-latency service requirement.

The following is an apparatus embodiment of this application, and may be used to perform the method embodiments of this application. For details not disclosed in the apparatus embodiment of this application, refer to the method embodiments of this application.

Figure 7:
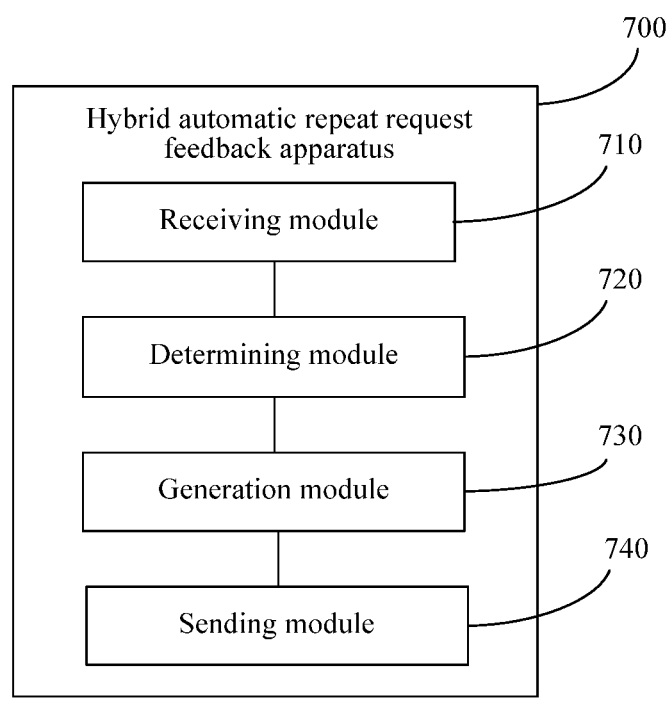
FIG. 7 is a schematic structural diagram of a hybrid automatic repeat request feedback apparatus according to an embodiment of the present disclosure.

FIG. 7 is a schematic structural diagram of a hybrid automatic repeat request feedback apparatus 700 according to an embodiment of the present disclosure. The apparatus is applied to a receive end. For example, the apparatus may be implemented as a part or all of the receive end in the implementation environment shown in FIG. 1-1 by using software, hardware, or a combination of hardware and software. As shown in FIG. 7, the apparatus 700 includes:

a receiving module 710, configured to receive data information sent by a transmit end, where the data information includes target data;

a determining module 720, configured to: when the target data in the data information is not checked, determine a measurement value of the target data, where the measurement value is used to indicate reliability of a physical channel for transmitting the target data;

a generation module 730, configured to generate feedback information based on the measurement value, where the feedback information carries an ACK or a NACK; and a sending module 740, configured to send the feedback information to the transmit end, so that the transmit end determines, based on the feedback information, whether the target data needs to be retransmitted.

In an implementable manner, the measurement value is a first quality value used to indicate a signal-to-noise ratio of the physical channel after the data information is equalized, and correspondingly, the generation module 730 is configured to:

when the first quality value is less than a quality threshold, generate the feedback information carrying the NACK; or when the first quality value is not less than a quality threshold, generate the feedback information carrying the ACK, where the quality threshold is determined based on at least one of a coding scheme, a code block length, and a bit rate of the target data.

The first quality value may be a value of ACMI, the quality threshold may be a symbol transmission rate of the target data, and correspondingly, the determining module 720 is configured to:

determine a BICM capacity of the physical channel; and determine the value of the ACMI based on the BICM capacity and a retransmission and combination mode of the target data.

Optionally, the retransmission and combination mode of the target data is a CC mode or an IR combination mode.

In an implementable manner, the measurement value is information statistics of the data information, and correspondingly, the generation module 730 is configured to:

determine an information error rate of the target data based on the information statistics; and when the information error rate is greater than an error rate threshold, generate the feedback information carrying the NACK; or when the information error rate is not greater than the error rate threshold, generate the feedback information carrying the ACK, where the error rate threshold is determined based on at least one of a coding scheme, a code block length, and a bit rate of the target data.

Optionally, the information statistics are information statistics after the data information is demodulated or information statistics after the data information is decoded.

Optionally, the information error rate is a code word error rate or an average bit error rate.

In an implementable manner, the measurement value is a signal-to-interference-plus-noise ratio of the physical channel, and correspondingly, the generation module 730 is configured to:

when the signal-to-interference-plus-noise ratio is less than a signal-to-interference-plus-noise ratio threshold, generate the feedback information carrying the NACK; or when the signal-to-interference-plus-noise ratio is not less than the signal-to-interference-plus-noise ratio threshold, generate the feedback information carrying the ACK, where the signal-to-interference-plus-noise ratio threshold is determined based on at least one of a coding scheme, a code block length, and a bit rate of the target data.

Optionally, the signal-to-interference-plus-noise ratio threshold may be determined based on the signal-to-interference-plus-noise ratio, an MCS table, and a BLER curve.

In an implementable manner, the measurement value is a signal-to-interference-plus-noise ratio of the physical channel, and correspondingly, the generation module 730 is configured to:

obtain a TBS on the physical channel;

determine a data transmission rate of the physical channel based on the signal-to-interference-plus-noise ratio; and when the TBS is less than the data transmission rate, generate the feedback information carrying the NACK; or when the TBS is not less than the data transmission rate, generate the feedback information carrying the ACK.

Optionally, the signal-to-interference-plus-noise ratio is a signal-to-interference-plus-noise ratio of the physical channel before the data information is equalized.

In addition, a working process of each module in FIG. 7 may be described with reference to the implementation shown in FIG. 2, FIG. 3-1, FIG. 4, FIG. 5, or FIG. 6. For example, the receiving module 710 is configured to perform operation 201 in the foregoing embodiment, the determining module 720 is configured to perform operation 202 in the foregoing embodiment, the generation module 730 is configured to perform operation 203 in the foregoing embodiment, and the sending module 740 is configured to perform operation 204 in the foregoing embodiment.

In conclusion, according to the hybrid automatic repeat request feedback apparatus provided in this embodiment of the present disclosure, the receive end can determine, when the target data in the data information is not checked, the measurement value of the target data, and send the feedback information to the transmit end based on the measurement value, so that the transmit end can determine, based on the feedback information, whether the target data needs to be retransmitted. Compared with the prior art, in this embodiment of the present disclosure, the receive end does not need to check the target data before sending the feedback information to the transmit end. Therefore, a total time for sending the feedback information is reduced and a consumed TTI is shorter. Therefore, a low-latency service requirement can be met.

Figure 8:
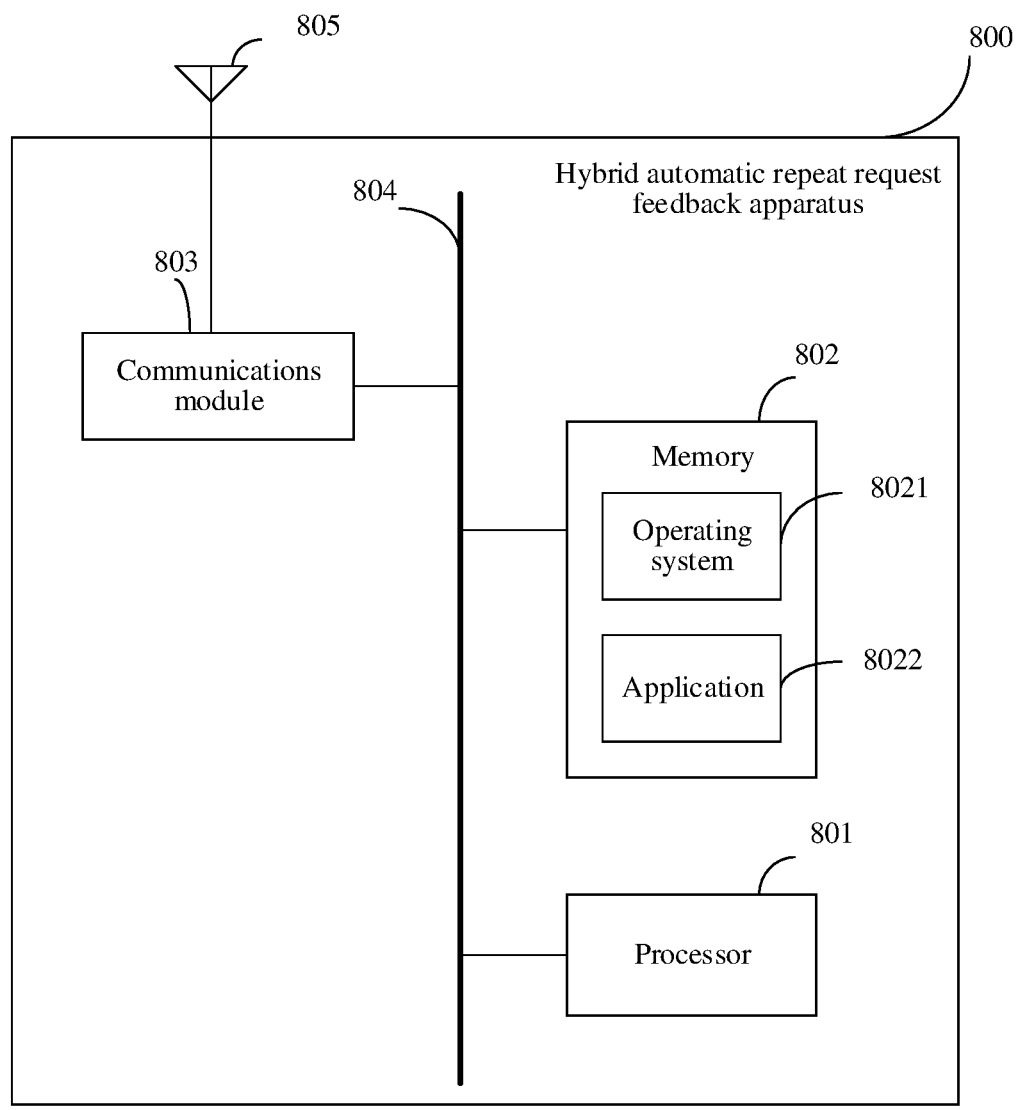
FIG. 8 is a schematic structural diagram of another hybrid automatic repeat request feedback apparatus according to an embodiment of the present disclosure.

FIG. 8 is a schematic structural diagram of another hybrid automatic repeat request feedback apparatus 800 according to an embodiment of the present disclosure. The apparatus is applied to a receive end, and the receive end may be the receive end in the implementation environment shown in FIG. 1-1. It should be understood that, the hybrid automatic repeat request feedback apparatus may have more or fewer components than those shown in FIG. 8, two or more components may be combined, or a different component deployment may be used. The components shown in FIG. 8 may be implemented in hardware, software, or a combination of hardware and software that includes one or more signal processing and/or application-specific integrated circuits. The hybrid automatic repeat request feedback apparatus shown in FIG. 8 is used herein as an example for a description. As shown in FIG. 8, the hybrid automatic repeat request feedback apparatus includes at least one processor 801, a memory 802, a communications module 803, at least one communications bus 804, and a communications antenna 805. The hybrid automatic repeat request feedback apparatus further includes other functional components, such as a battery module and a wired/wireless charging structure. The communications bus 804 is configured to implement connection and communication between these components. The memory 802 may include a non-volatile solid-state memory and/or a non-volatile dynamic storage device, such as a flash memory or a rotatable disk drive. The communications module 803 may be applied to remote communication, such as Global System for Mobile Communications (GSM), Code Division Multiple Access (CDMA), general packet radio service (GPRS), Enhanced Data rates for GSM Evolution (EDGE), a 3G technology such as Wideband Code Division Multiple Access (WCDMA) or Time Division-Synchronous Code Division Multiple Access (TD-SCDMA), a 4G technology such as LTE, or a 5G technology. The communications antenna 805 is configured to receive and send a communication signal.

The memory 802 includes an operating system 8021 and an application 8022. The operating system 8021 includes various operating system programs, configured to implement various hardware-based operations. The application 8022 includes various applications, configured to implement various application functions. For example, a program for determining a measurement value of target data and a feedback information generation program can enable the receive end to determine, when target data in data information is not checked, a measurement value of the target data, and generate feedback information based on the measurement value. The measurement value is used to indicate reliability of a physical channel for transmitting the target data. The feedback information carries an ACK or a NACK.

The processor 801 communicates with the modules and components by using the communications bus 804. The processor 801 can execute the application stored in the memory 802 to implement the receive end, so that the receive end implements the foregoing hybrid automatic repeat request feedback method.

The hybrid automatic repeat request feedback apparatus provided in this embodiment of the present disclosure implements, through cooperation among the foregoing execution modules, the method embodiment shown in FIG. 2, FIG. 3-1, FIG. 4, FIG. 5, or FIG. 6, and various functions and operations implemented by the receive end in the apparatus embodiment shown in FIG. 7. The determining module 720 and the generation module 730 in FIG. 7 may be implemented by the processor 801 executing the application stored in the memory 802. The receiving module 710 and the sending module 740 in FIG. 7 may be implemented by the communications module 803 and the communications antenna 805.

In conclusion, according to the hybrid automatic repeat request feedback apparatus provided in this embodiment of the present disclosure, the receive end can determine, when the target data in the data information is not checked, the measurement value of the target data, and send the feedback information to the transmit end based on the measurement value, so that the transmit end can determine, based on the feedback information, whether the target data needs to be retransmitted. Compared with the prior art, in this embodiment of the present disclosure, the receive end does not need to check the target data before sending the feedback information to the transmit end. Therefore, a total time for sending the feedback information is reduced and a consumed TTI is shorter. Therefore, a low-latency service requirement can be met.

It may be clearly understood by a person skilled in the art that, for the purpose of convenient and brief description, for a specific working process of the foregoing apparatus and module, refer to a corresponding process in the foregoing method embodiments. Details are not described herein again.

It should be understood that, the hybrid automatic repeat request feedback method and the hybrid automatic repeat request feedback apparatus disclosed in the embodiments provided in this application may be implemented in another manner. For example, the described hybrid automatic repeat request feedback apparatus embodiment is merely an example. For example, the module division in the hybrid automatic repeat request feedback apparatus is merely logical function division, and may be other division during actual implementation. For example, a plurality of modules or components may be combined or integrated into another system, or some features may be ignored or not performed.

A person of ordinary skill in the art may understand that all or some of the operations of the embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made without departing from the principle of this application should fall within the protection scope of this application.

What is claimed is:

1. A communications method, applied to a receive end, wherein the method comprises:
receiving data information from a transmit end, wherein the data information comprises target data;
when the target data in the data information is not checked, determining a measurement value of the target data, wherein the measurement value is used to indicate reliability of a physical channel for transmitting the target data;

generating feedback information based on the measurement value, wherein the feedback information carries an acknowledgement (ACK) or a negative acknowledgement (NACK); and sending the feedback information to the transmit end, so that the transmit end determines, based on the feedback information, whether the target data needs to be retransmitted, wherein:

the measurement value is a first quality value used to indicate a signal-to-noise ratio of the physical channel after the data information is equalized, and the generating feedback information based on the measurement value comprises:

when the first quality value is less than a quality threshold generating the feedback information carrying the NACK; or when the first quality value is not less than the quality threshold, generating the feedback information carrying the ACK;

the quality threshold is determined based on at least one of a coding scheme, a code block length, or a bit rate of the target data; and the first quality value is a value of accumulated conditional mutual information (ACMI), the quality threshold is a symbol transmission rate of the target data, and the determining the measurement value of the target data comprises:

determining a bit-interleaved coded modulation (BICM) capacity of the physical channel; and determining the value of the ACMI based on the BICM capacity and a retransmission and combination mode of the target data.

2. The method according to claim 1, wherein
the retransmission and combination mode of the target data is a chase combining (CC) mode or an incremental redundancy (IR) combination mode.

3. A communications apparatus, wherein the apparatus comprises:
a processor; and
a memory unit coupled to the processor for storing program instructions,
wherein the program instructions, when executed by the processor, cause the apparatus to:

receive data information from a transmit end, wherein the data information comprises target data;

when the target data in the data information is not checked, determine a measurement value of the target data, wherein the measurement value is used to indicate reliability of a physical channel for transmitting the target data;

generate feedback information based on the measurement value, wherein the feedback information carries an acknowledgement (ACK) or a negative acknowledgement (NACK); and send the feedback information to the transmit end, so that the transmit end determines, based on the feedback information, whether the target data needs to be retransmitted, wherein:

the measurement value is a first quality value used to indicate a signal-to-noise ratio of the physical channel after the data information is equalized, and the program instructions further cause the apparatus to:

when the first quality value is less than a quality threshold, generate the feedback information carrying the NACK; or when the first quality value is not less than a quality threshold, generate the feedback information carrying the ACK;

the quality threshold is determined based on at least one of a coding scheme, a code block length, or a bit rate of the target data;

the first quality value is a value of accumulated conditional mutual information ACMI, the quality threshold is a symbol transmission rate of the target data, and the program instructions further cause the apparatus to:

determine a bit-interleaved coded modulation (BICM) capacity of the physical channel; and determine the value of the ACMI based on the BICM capacity and a retransmission and combination mode of the target data.

4. The apparatus according to claim 3, wherein
the retransmission and combination mode of the target data is a chase combining (CC) mode or an incremental redundancy (IR) combination mode.

* * * * *